(12) United States Patent
Jales Costa et al.

(10) Patent No.: US 11,077,795 B2
(45) Date of Patent: Aug. 3, 2021

(54) TRAILER ANGLE DETECTION USING END-TO-END LEARNING

(71) Applicant: Ford Global Technologies, LLC, Dearborn, MI (US)

(72) Inventors: Bruno Sielly Jales Costa, Santa Clara, CA (US); Vidya Nariyambut Murali, Sunnyvale, CA (US); Saeid Nooshabadi, Houghton, MI (US); Vijay Nagasamy, Freemont, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 330 days.

(21) Appl. No.: 16/199,851

(22) Filed: Nov. 26, 2018

(65) Prior Publication Data

US 2020/0164803 A1 May 28, 2020

(51) Int. Cl.
| | |
|---|---|
| *B60R 1/00* | (2006.01) |
| *G06K 9/00* | (2006.01) |
| *G06T 3/40* | (2006.01) |
| *B62D 15/02* | (2006.01) |
| *B62D 13/06* | (2006.01) |

(52) U.S. Cl.
CPC .............. *B60R 1/003* (2013.01); *B62D 13/06* (2013.01); *B62D 15/021* (2013.01); *B62D 15/027* (2013.01); *G06K 9/00791* (2013.01); *G06T 3/4046* (2013.01); *G06T 2207/20084* (2013.01); *G06T 2207/30264* (2013.01)

(58) Field of Classification Search
None
See application file for complete search history.

(56) References Cited

U.S. PATENT DOCUMENTS

| | | | |
|---|---|---|---|
| 3,542,390 A | 11/1970 | Fikes et al. | |
| 3,605,088 A | 9/1971 | Savelli | |
| 3,787,077 A | 1/1974 | Sanders | |
| 3,833,928 A | 9/1974 | Gavit et al. | |

(Continued)

FOREIGN PATENT DOCUMENTS

| | | |
|---|---|---|
| CN | 102582686 B | 9/2013 |
| CN | 106250893 A | 12/2016 |

(Continued)

OTHER PUBLICATIONS

Novak, Domen; Dovzan, Dejan; Grebensek, Rok; Oblak, Simon, "Automated Parking System for a Truck and Trailer", International Conference on Advances in the Internet, Processing, Systems and Interdisciplinary Research, Florence, 2007, WorldCat.org, 13 pgs.

(Continued)

*Primary Examiner* — Ricky Chin
(74) *Attorney, Agent, or Firm* — Frank MacKenzie; Price Heneveld LLP

(57) ABSTRACT

A trailer angle identification system comprises an imaging device configured to capture an image. An angle sensor is configured to measure a first angle of the trailer relative to a vehicle. A controller is configured to process the image in a neural network and estimate a second angle of the trailer relative to the vehicle based on the image. The controller is further configured to train the neural network based on a difference between the first angle and the second angle.

18 Claims, 9 Drawing Sheets

(56) References Cited

U.S. PATENT DOCUMENTS

| | | |
|---|---|---|
| 3,860,257 A | 1/1975 | Mesley |
| 4,040,006 A | 8/1977 | Kimmel |
| 4,042,132 A | 8/1977 | Bohman et al. |
| 4,122,390 A | 10/1978 | Kollitz et al. |
| 4,212,483 A | 7/1980 | Howard |
| 4,366,966 A | 1/1983 | Ratsko et al. |
| 4,735,432 A | 4/1988 | Brown |
| 4,752,080 A | 6/1988 | Rogers |
| 4,848,449 A | 7/1989 | Martinet et al. |
| 4,852,901 A | 8/1989 | Beasley et al. |
| 4,943,080 A | 7/1990 | Reimer |
| 5,001,639 A | 3/1991 | Breen |
| 5,056,905 A | 10/1991 | Jensen |
| 5,097,250 A | 3/1992 | Hernandez |
| 5,108,123 A | 4/1992 | Rubenzik |
| 5,108,158 A | 4/1992 | Breen |
| 5,132,851 A | 7/1992 | Bomar et al. |
| 5,152,544 A | 10/1992 | Dierker, Jr. et al. |
| 5,191,328 A | 3/1993 | Nelson |
| 5,244,226 A | 9/1993 | Bergh |
| 5,246,242 A | 9/1993 | Penzotti |
| 5,247,442 A | 9/1993 | Kendall |
| 5,282,641 A | 2/1994 | McLaughlin |
| 5,289,892 A | 3/1994 | Notsu |
| 5,290,057 A | 3/1994 | Pellerito |
| 5,455,557 A | 10/1995 | Noll et al. |
| 5,521,633 A | 5/1996 | Nakajima et al. |
| 5,523,947 A | 6/1996 | Breen |
| 5,541,778 A | 7/1996 | DeFlorio |
| 5,558,350 A | 9/1996 | Kimbrough et al. |
| 5,559,696 A | 9/1996 | Borenstein |
| 5,579,228 A | 11/1996 | Kimbrough et al. |
| 5,631,656 A | 5/1997 | Hartman et al. |
| 5,650,764 A | 7/1997 | McCullough |
| 5,690,347 A | 11/1997 | Juergens et al. |
| 5,719,713 A | 2/1998 | Brown |
| 5,747,683 A | 5/1998 | Gerum et al. |
| 5,821,852 A | 10/1998 | Fairchild |
| 5,980,048 A | 11/1999 | Rannells, Jr. et al. |
| 6,041,582 A | 3/2000 | Tiede et al. |
| 6,042,196 A | 3/2000 | Nakamura et al. |
| 6,124,709 A | 9/2000 | Allwine |
| 6,151,175 A | 11/2000 | Osha |
| 6,198,992 B1 | 3/2001 | Winslow |
| 6,217,177 B1 | 4/2001 | Rost |
| 6,218,828 B1 | 4/2001 | Bates et al. |
| 6,223,104 B1 | 4/2001 | Kamen et al. |
| 6,223,114 B1 | 4/2001 | Boros et al. |
| 6,268,800 B1 | 7/2001 | Howard |
| 6,292,094 B1 | 9/2001 | Deng et al. |
| 6,351,698 B1 | 2/2002 | Kubota et al. |
| 6,472,865 B1 | 10/2002 | Tola et al. |
| 6,480,104 B1 | 11/2002 | Wall et al. |
| 6,483,429 B1 | 11/2002 | Yasui et al. |
| 6,494,476 B2 | 12/2002 | Masters et al. |
| 6,498,977 B2 | 12/2002 | Wetzel et al. |
| 6,539,288 B2 | 3/2003 | Ishida et al. |
| 6,568,093 B2 | 5/2003 | Kogiso et al. |
| 6,577,952 B2 | 6/2003 | Geier et al. |
| 6,668,225 B2 | 12/2003 | Oh et al. |
| 6,704,653 B2 | 3/2004 | Kuriya et al. |
| 6,712,378 B1 | 3/2004 | Austin |
| 6,801,125 B1 | 10/2004 | McGregor et al. |
| 6,806,809 B2 | 10/2004 | Lee et al. |
| 6,820,888 B1 | 11/2004 | Griffin |
| 6,838,979 B2 | 1/2005 | Deng et al. |
| 6,854,557 B1 | 2/2005 | Deng et al. |
| 6,857,494 B2 | 2/2005 | Kobayashi et al. |
| 6,879,240 B2 | 4/2005 | Kruse |
| 6,956,468 B2 | 10/2005 | Lee et al. |
| 6,959,970 B2 | 11/2005 | Tseng |
| 6,999,856 B2 | 2/2006 | Lee et al. |
| 7,005,974 B2 | 2/2006 | McMahon et al. |
| 7,006,127 B2 | 2/2006 | Mizusawa et al. |
| 7,008,088 B2 | 3/2006 | Pisciotti |
| 7,028,804 B2 | 4/2006 | Eki et al. |
| 7,032,705 B2 | 4/2006 | Zheng et al. |
| 7,046,127 B2 | 5/2006 | Boddy |
| 7,058,493 B2 | 6/2006 | Inagaki |
| 7,089,101 B2 | 8/2006 | Fischer et al. |
| 7,154,385 B2 | 12/2006 | Lee et al. |
| 7,159,890 B2 | 1/2007 | Craig et al. |
| 7,167,785 B2 | 1/2007 | Lohberg et al. |
| 7,170,285 B2 | 1/2007 | Spratte |
| 7,171,330 B2 | 1/2007 | Kruse et al. |
| 7,204,504 B2 | 4/2007 | Gehring et al. |
| 7,219,913 B2 | 5/2007 | Atley |
| 7,225,891 B2 | 6/2007 | Gehring et al. |
| 7,229,139 B2 | 6/2007 | Lu et al. |
| 7,239,958 B2 | 7/2007 | Grougan et al. |
| 7,269,489 B2 | 9/2007 | Deng et al. |
| 7,272,481 B2 | 9/2007 | Einig et al. |
| 7,295,907 B2 | 11/2007 | Lu et al. |
| 7,401,871 B2 | 7/2008 | Lu et al. |
| 7,405,557 B2 | 7/2008 | Spratte et al. |
| 7,413,266 B2 | 8/2008 | Lenz et al. |
| 7,425,889 B2 | 9/2008 | Widmann et al. |
| 7,447,585 B2 | 11/2008 | Tandy, Jr. et al. |
| 7,451,020 B2 | 11/2008 | Goetting et al. |
| 7,463,137 B2 | 12/2008 | Wishart et al. |
| 7,504,995 B2 | 3/2009 | Lawrence et al. |
| 7,532,109 B2 | 5/2009 | Takahama et al. |
| 7,540,523 B2 | 6/2009 | Russell et al. |
| 7,548,155 B2 | 6/2009 | Schutt et al. |
| 7,568,716 B2 | 8/2009 | Dietz |
| 7,623,952 B2 | 11/2009 | Unruh et al. |
| 7,648,153 B2 | 1/2010 | Metternich et al. |
| 7,690,737 B2 | 4/2010 | Lu |
| 7,715,953 B2 | 5/2010 | Shepard |
| 7,731,302 B2 | 6/2010 | Tandy, Jr. et al. |
| 7,793,965 B2 | 9/2010 | Padula |
| 7,798,263 B2 | 9/2010 | Tandy, Jr. et al. |
| 7,878,545 B2 | 2/2011 | Rhymer et al. |
| 7,904,222 B2 | 3/2011 | Lee et al. |
| 7,905,507 B2 | 3/2011 | Perri |
| 7,950,751 B2 | 5/2011 | Offerle et al. |
| 7,953,536 B2 | 5/2011 | Katrak |
| 7,974,444 B2 | 7/2011 | Hongo |
| 8,010,252 B2 | 8/2011 | Getman et al. |
| 8,010,253 B2 | 8/2011 | Lundquist |
| 8,036,792 B2 | 10/2011 | Dechamp |
| 8,038,166 B1 | 10/2011 | Piesinger |
| 8,044,779 B2 | 10/2011 | Hahn et al. |
| 8,073,594 B2 | 12/2011 | Lee et al. |
| 8,157,284 B1 | 4/2012 | McGhie et al. |
| 8,165,770 B2 | 4/2012 | Getman et al. |
| 8,167,444 B2 | 5/2012 | Lee et al. |
| 8,170,726 B2 | 5/2012 | Chen et al. |
| 8,174,576 B2 | 5/2012 | Akatsuka et al. |
| 8,180,543 B2 | 5/2012 | Futamura et al. |
| 8,190,364 B2 | 5/2012 | Rekow |
| 8,191,915 B2 | 6/2012 | Freese, V et al. |
| 8,192,036 B2 | 6/2012 | Lee et al. |
| 8,215,436 B2 | 7/2012 | DeGrave et al. |
| 8,223,204 B2 | 7/2012 | Hahn |
| 8,244,442 B2 | 8/2012 | Craig et al. |
| 8,260,518 B2 | 9/2012 | Englert |
| 8,267,485 B2 | 9/2012 | Barlsen et al. |
| 8,280,607 B2 | 10/2012 | Gatti et al. |
| 8,308,182 B2 | 11/2012 | Ortmann et al. |
| 8,326,504 B2 | 12/2012 | Wu et al. |
| 8,342,560 B2 | 1/2013 | Albers et al. |
| 8,380,390 B2 | 2/2013 | Sy et al. |
| 8,380,416 B2 | 2/2013 | Offerle et al. |
| 8,393,632 B2 | 3/2013 | Vortmeyer et al. |
| 8,401,744 B2 | 3/2013 | Chiocco |
| 8,427,288 B2 | 4/2013 | Schofield et al. |
| 8,469,125 B2 | 6/2013 | Yu et al. |
| 8,504,243 B2 | 8/2013 | Kageyama |
| 8,548,680 B2 | 10/2013 | Ryerson et al. |
| 8,548,683 B2 | 10/2013 | Cebon et al. |
| 8,576,115 B2 | 11/2013 | Basten |
| 8,626,382 B2 | 1/2014 | Obradovich |
| 8,675,953 B1 | 3/2014 | Elwell et al. |

(56) References Cited

U.S. PATENT DOCUMENTS

| | | |
|---|---|---|
| 8,755,984 B2 | 6/2014 | Rupp et al. |
| 8,807,261 B2 | 8/2014 | Subrt et al. |
| 8,825,328 B2 | 9/2014 | Rupp et al. |
| 8,833,789 B2 | 9/2014 | Anderson |
| 8,886,400 B2 | 11/2014 | Kossira et al. |
| 8,888,120 B2 | 11/2014 | Trevino |
| 8,909,426 B2 | 12/2014 | Rhode et al. |
| 8,930,140 B2 | 1/2015 | Trombley et al. |
| 8,939,462 B2 | 1/2015 | Adamczyk et al. |
| 8,955,865 B2 | 2/2015 | Fortin et al. |
| 8,972,109 B2 | 3/2015 | Lavoie et al. |
| 9,008,913 B1 | 4/2015 | Sears et al. |
| 9,026,311 B1 | 5/2015 | Pieronek et al. |
| 9,042,603 B2 | 5/2015 | Elwart et al. |
| 9,082,315 B2 | 7/2015 | Lin et al. |
| 9,108,598 B2 | 8/2015 | Headley |
| 9,114,832 B2 | 8/2015 | Wang et al. |
| 9,120,358 B2 | 9/2015 | Molls et al. |
| 9,120,359 B2 | 9/2015 | Chiu et al. |
| 9,156,496 B2 | 10/2015 | Greenwood et al. |
| 9,164,955 B2 | 10/2015 | Lavoie et al. |
| 9,180,890 B2 | 11/2015 | Lu et al. |
| 9,187,124 B2 | 11/2015 | Trombley et al. |
| 9,227,474 B2 | 1/2016 | Liu |
| 9,238,483 B2 | 1/2016 | Hafner et al. |
| 9,248,858 B2 | 2/2016 | Lavoie et al. |
| 9,296,422 B2 | 3/2016 | Lavoie |
| 9,315,212 B1 | 4/2016 | Kyrtsos et al. |
| 9,321,483 B2 | 4/2016 | Headley |
| 9,335,162 B2 | 5/2016 | Kyrtsos et al. |
| 9,340,228 B2 | 5/2016 | Xu et al. |
| 9,393,996 B2 | 7/2016 | Goswami et al. |
| 9,428,188 B2 | 8/2016 | Schwindt et al. |
| 9,434,414 B2 | 9/2016 | Lavoie |
| 9,437,055 B2 | 9/2016 | Kuehnie et al. |
| 9,500,497 B2 | 11/2016 | Lavoie |
| 9,610,974 B2 | 4/2017 | Herzog et al. |
| 9,616,923 B2 | 4/2017 | Lavoie |
| 9,623,904 B2 | 4/2017 | Lavoie et al. |
| 9,676,377 B2 | 6/2017 | Hafner et al. |
| 9,731,568 B2 | 8/2017 | Wuergler et al. |
| 9,798,953 B2 | 10/2017 | Hu |
| 9,802,542 B2 | 10/2017 | Lu et al. |
| 9,827,818 B2 | 11/2017 | Hu et al. |
| 9,836,060 B2 | 12/2017 | Ghneim et al. |
| 9,840,278 B2 | 12/2017 | Lavoie et al. |
| 10,046,800 B2 | 8/2018 | Hu et al. |
| 10,169,678 B1 * | 1/2019 | Sachdeva ............ G05D 1/0221 |
| 2001/0024333 A1 | 9/2001 | Rost |
| 2001/0037164 A1 | 11/2001 | Hecker |
| 2002/0128764 A1 | 9/2002 | Hecker et al. |
| 2004/0017285 A1 | 1/2004 | Zielinski et al. |
| 2004/0021291 A1 | 2/2004 | Haug et al. |
| 2004/0093139 A1 | 5/2004 | Wildey et al. |
| 2004/0130441 A1 | 7/2004 | Lee et al. |
| 2004/0222881 A1 | 11/2004 | Deng et al. |
| 2005/0000738 A1 | 1/2005 | Gehring et al. |
| 2005/0128059 A1 | 6/2005 | Vause |
| 2005/0206224 A1 | 9/2005 | Lu |
| 2005/0206225 A1 | 9/2005 | Offerle et al. |
| 2005/0206229 A1 | 9/2005 | Lu et al. |
| 2005/0206231 A1 | 9/2005 | Lu et al. |
| 2005/0236201 A1 | 10/2005 | Spannheimer et al. |
| 2005/0236896 A1 | 10/2005 | Offerle et al. |
| 2006/0041358 A1 | 2/2006 | Hara |
| 2006/0071447 A1 | 4/2006 | Gehring et al. |
| 2006/0076828 A1 | 4/2006 | Lu et al. |
| 2006/0103511 A1 | 5/2006 | Lee et al. |
| 2006/0111820 A1 | 5/2006 | Goetting et al. |
| 2006/0142936 A1 | 6/2006 | Dix |
| 2006/0155455 A1 | 7/2006 | Lucas et al. |
| 2006/0244579 A1 | 11/2006 | Raab |
| 2007/0027581 A1 | 2/2007 | Bauer et al. |
| 2007/0090688 A1 | 4/2007 | Haemmerling et al. |
| 2007/0132560 A1 | 6/2007 | Nystrom et al. |
| 2007/0152424 A1 | 7/2007 | Deng et al. |
| 2007/0285808 A1 | 12/2007 | Beale |
| 2008/0143593 A1 | 6/2008 | Graziano et al. |
| 2008/0147277 A1 | 6/2008 | Lu et al. |
| 2008/0231701 A1 | 9/2008 | Greenwood et al. |
| 2008/0312792 A1 | 12/2008 | Dechamp |
| 2009/0005932 A1 | 1/2009 | Lee et al. |
| 2009/0079828 A1 | 3/2009 | Lee et al. |
| 2009/0085775 A1 | 4/2009 | Otsuka et al. |
| 2009/0093928 A1 | 4/2009 | Getman et al. |
| 2009/0198425 A1 | 8/2009 | Englert |
| 2009/0228182 A1 | 9/2009 | Waldbauer et al. |
| 2009/0248346 A1 | 10/2009 | Fennel et al. |
| 2009/0300701 A1 | 12/2009 | Karaoguz et al. |
| 2009/0306861 A1 | 12/2009 | Schumann et al. |
| 2010/0063702 A1 | 3/2010 | Sabelstrom et al. |
| 2010/0171828 A1 | 7/2010 | Ishii |
| 2010/0332049 A1 | 12/2010 | Sy et al. |
| 2011/0001825 A1 | 1/2011 | Hahn |
| 2011/0018231 A1 | 1/2011 | Collenberg |
| 2011/0022282 A1 | 1/2011 | Wu et al. |
| 2011/0087398 A1 | 4/2011 | Lu et al. |
| 2011/0112721 A1 | 5/2011 | Wang et al. |
| 2011/0125457 A1 | 5/2011 | Lee et al. |
| 2011/0160956 A1 | 6/2011 | Chung et al. |
| 2011/0257860 A1 | 10/2011 | Getman et al. |
| 2012/0041658 A1 | 2/2012 | Turner |
| 2012/0086808 A1 | 4/2012 | Lynam et al. |
| 2012/0095649 A1 | 4/2012 | Klier et al. |
| 2012/0109471 A1 | 5/2012 | Wu |
| 2012/0112434 A1 | 5/2012 | Albers et al. |
| 2012/0185131 A1 | 7/2012 | Headley |
| 2012/0200706 A1 | 8/2012 | Greenwood et al. |
| 2012/0271512 A1 | 10/2012 | Rupp et al. |
| 2012/0271514 A1 | 10/2012 | Lavoie et al. |
| 2012/0271515 A1 | 10/2012 | Rhode et al. |
| 2012/0271522 A1 | 10/2012 | Rupp et al. |
| 2012/0283909 A1 | 11/2012 | Dix |
| 2012/0283910 A1 | 11/2012 | Lee et al. |
| 2012/0310594 A1 | 12/2012 | Watanabe |
| 2013/0006472 A1 | 1/2013 | McClain et al. |
| 2013/0024064 A1 | 1/2013 | Shepard |
| 2013/0027195 A1 | 1/2013 | Van Wiemeersch et al. |
| 2013/0082453 A1 | 4/2013 | Padula |
| 2013/0158863 A1 | 6/2013 | Skvarce et al. |
| 2013/0179038 A1 | 7/2013 | Goswami et al. |
| 2013/0207834 A1 | 8/2013 | Mizutani et al. |
| 2013/0226390 A1 | 8/2013 | Luo et al. |
| 2013/0250114 A1 | 9/2013 | Lu |
| 2013/0261843 A1 | 10/2013 | Kossira et al. |
| 2013/0268160 A1 | 10/2013 | Trombley et al. |
| 2014/0005918 A1 | 1/2014 | Qiang |
| 2014/0025260 A1 | 1/2014 | McClure |
| 2014/0052337 A1 | 2/2014 | Lavoie et al. |
| 2014/0058614 A1 | 2/2014 | Trombley et al. |
| 2014/0058622 A1 | 2/2014 | Trombley et al. |
| 2014/0058655 A1 | 2/2014 | Trombley et al. |
| 2014/0058668 A1 | 2/2014 | Trombley et al. |
| 2014/0067154 A1 | 3/2014 | Yu et al. |
| 2014/0067155 A1 | 3/2014 | Yu et al. |
| 2014/0085472 A1 | 3/2014 | Lu et al. |
| 2014/0088824 A1 | 3/2014 | Ishimoto |
| 2014/0160276 A1 | 6/2014 | Pliefke et al. |
| 2014/0172232 A1 | 6/2014 | Rupp et al. |
| 2014/0183841 A1 | 7/2014 | Jones |
| 2014/0188344 A1 | 7/2014 | Lavoie |
| 2014/0188346 A1 | 7/2014 | Lavoie |
| 2014/0210456 A1 | 7/2014 | Crossman |
| 2014/0218506 A1 | 8/2014 | Trombley et al. |
| 2014/0218522 A1 | 8/2014 | Lavoie et al. |
| 2014/0222288 A1 | 8/2014 | Lavoie et al. |
| 2014/0236532 A1 | 8/2014 | Trombley et al. |
| 2014/0249691 A1 | 9/2014 | Hafner et al. |
| 2014/0267688 A1 * | 9/2014 | Aich ................ B60W 50/0097 348/113 |
| 2014/0267689 A1 | 9/2014 | Lavoie |
| 2014/0277941 A1 | 9/2014 | Chiu et al. |
| 2014/0277942 A1 | 9/2014 | Kyrtsos et al. |
| 2014/0297128 A1 | 10/2014 | Lavoie et al. |

(56) References Cited

U.S. PATENT DOCUMENTS

| | | |
|---|---|---|
| 2014/0297129 A1 | 10/2014 | Lavoie et al. |
| 2014/0303847 A1 | 10/2014 | Lavoie |
| 2014/0309888 A1 | 10/2014 | Smit et al. |
| 2014/0324295 A1 | 10/2014 | Lavoie |
| 2014/0343795 A1 | 11/2014 | Lavoie |
| 2014/0358429 A1 | 12/2014 | Shutko et al. |
| 2014/0379217 A1 | 12/2014 | Rupp et al. |
| 2015/0002670 A1 | 1/2015 | Bajpai |
| 2015/0035256 A1 | 2/2015 | Klank et al. |
| 2015/0057903 A1 | 2/2015 | Rhode et al. |
| 2015/0066296 A1 | 3/2015 | Trombley et al. |
| 2015/0066298 A1 | 3/2015 | Sharma et al. |
| 2015/0105975 A1 | 4/2015 | Dunn |
| 2015/0115571 A1 | 4/2015 | Zhang et al. |
| 2015/0120141 A1 | 4/2015 | Lavoie et al. |
| 2015/0120143 A1 | 4/2015 | Schlichting |
| 2015/0134183 A1 | 5/2015 | Lavoie et al. |
| 2015/0138340 A1 | 5/2015 | Lavoie |
| 2015/0149040 A1 | 5/2015 | Hueger et al. |
| 2015/0158527 A1 | 6/2015 | Hafner et al. |
| 2015/0165850 A1 | 6/2015 | Chiu et al. |
| 2015/0197278 A1 | 7/2015 | Boos et al. |
| 2015/0203156 A1 | 7/2015 | Hafner et al. |
| 2015/0210254 A1 | 7/2015 | Pieronek et al. |
| 2015/0210317 A1 | 7/2015 | Hafner et al. |
| 2015/0217693 A1 | 8/2015 | Pliefke et al. |
| 2015/0269444 A1 | 9/2015 | Lameyre et al. |
| 2016/0001705 A1 | 1/2016 | Greenwood et al. |
| 2016/0009288 A1 | 1/2016 | Yu |
| 2016/0039456 A1* | 2/2016 | Lavoie ................ B60D 1/62 701/41 |
| 2016/0059780 A1 | 3/2016 | Lavoie |
| 2016/0059888 A1 | 3/2016 | Bradley et al. |
| 2016/0059889 A1 | 3/2016 | Herzog et al. |
| 2016/0096549 A1 | 4/2016 | Herzog et al. |
| 2016/0129939 A1 | 5/2016 | Singh et al. |
| 2016/0152263 A1 | 6/2016 | Singh et al. |
| 2016/0153778 A1 | 6/2016 | Singh et al. |
| 2016/0229452 A1 | 8/2016 | Lavoie et al. |
| 2016/0280267 A1 | 9/2016 | Lavoie et al. |
| 2017/0043806 A1* | 2/2017 | Muharemovic ........ B60K 35/00 |
| 2017/0073005 A1 | 3/2017 | Ghneim et al. |
| 2017/0101130 A1 | 4/2017 | Lavoie |
| 2017/0106796 A1 | 4/2017 | Lavoie et al. |
| 2017/0174130 A1 | 6/2017 | Hu et al. |
| 2017/0278014 A1* | 9/2017 | Lessmann ................ G06T 5/20 |
| 2017/0297619 A1 | 10/2017 | Lavoie et al. |
| 2017/0297620 A1 | 10/2017 | Lavoie et al. |
| 2017/0313351 A1 | 11/2017 | Lavoie |
| 2018/0012411 A1* | 1/2018 | Richey ................ G06T 19/006 |
| 2018/0251153 A1 | 9/2018 | Li et al. |
| 2018/0253608 A1 | 9/2018 | Diessner et al. |
| 2018/0276839 A1* | 9/2018 | Diessner ................ G06T 7/60 |
| 2019/0016264 A1* | 1/2019 | Potnis ................ B60D 1/64 |
| 2019/0016382 A1* | 1/2019 | Zarco ................ G05D 1/0212 |
| 2019/0039633 A1* | 2/2019 | Li ................ G06K 9/00791 |
| 2019/0122384 A1* | 4/2019 | Ertle ................ G06K 9/00664 |
| 2019/0180502 A1 | 6/2019 | England ................ G06T 15/08 |
| 2019/0279366 A1* | 9/2019 | Sick ................ G06K 9/6256 |
| 2019/0289282 A1* | 9/2019 | Briggs ................ H04N 13/296 |
| 2019/0294966 A1* | 9/2019 | Khan ................ G06K 9/6267 |
| 2020/0130582 A1* | 4/2020 | Wong ................ B62D 15/0285 |

FOREIGN PATENT DOCUMENTS

| | | |
|---|---|---|
| DE | 3923676 A1 | 1/1991 |
| DE | 3931518 A1 | 4/1991 |
| DE | 9208595 U1 | 8/1992 |
| DE | 19526702 A1 | 2/1997 |
| DE | 10030738 C1 | 8/2001 |
| DE | 10031244 A1 | 1/2002 |
| DE | 10065230 A1 | 7/2002 |
| DE | 10122562 C1 | 7/2002 |
| DE | 10154612 A1 | 5/2003 |
| DE | 10312548 B3 | 5/2004 |
| DE | 10333998 A1 | 2/2005 |
| DE | 102004050149 A1 | 4/2006 |
| DE | 102005042957 A1 | 3/2007 |
| DE | 102005043466 A1 | 3/2007 |
| DE | 102005043467 A1 | 3/2007 |
| DE | 102005043468 A1 | 3/2007 |
| DE | 102006002294 A1 | 7/2007 |
| DE | 102006048947 A1 | 4/2008 |
| DE | 102006056408 A1 | 6/2008 |
| DE | 102008020838 A1 | 11/2008 |
| DE | 102007029413 A1 | 1/2009 |
| DE | 102008045436 A1 | 3/2010 |
| DE | 102006035021 B4 | 4/2010 |
| DE | 102008043675 A1 | 5/2010 |
| DE | 102009007990 A1 | 8/2010 |
| DE | 102009012253 A1 | 9/2010 |
| DE | 102009027041 A1 | 12/2010 |
| DE | 102009038552 A1 | 2/2011 |
| DE | 102010006323 A1 | 8/2011 |
| DE | 102008004158 B4 | 10/2011 |
| DE | 102008004159 B4 | 10/2011 |
| DE | 102008004160 B4 | 10/2011 |
| DE | 102010021052 A1 | 11/2011 |
| DE | 102010029184 A1 | 11/2011 |
| DE | 102010045519 A1 | 3/2012 |
| DE | 102011104256 A1 | 7/2012 |
| DE | 102011101990 B3 | 10/2012 |
| DE | 102012005707 A1 | 10/2012 |
| DE | 202012010517 U | 12/2012 |
| DE | 102011108440 A1 | 1/2013 |
| DE | 102011120814 A1 | 6/2013 |
| DE | 102012006206 A1 | 10/2013 |
| DE | 102012206133 A1 | 10/2013 |
| DE | 102012019234 A1 | 4/2014 |
| DE | 102013000198 A1 | 7/2014 |
| EP | 0418653 A1 | 3/1991 |
| EP | 0433858 A2 | 6/1991 |
| EP | 1361543 A2 | 11/2003 |
| EP | 1593552 B1 | 3/2007 |
| EP | 1810913 A1 | 7/2007 |
| EP | 2388180 A2 | 11/2011 |
| EP | 2452549 A1 | 5/2012 |
| EP | 2487454 A2 | 8/2012 |
| EP | 2551132 A1 | 1/2013 |
| EP | 2644477 A1 | 10/2013 |
| EP | 2803944 A2 | 11/2014 |
| FR | 2515379 A1 | 4/1983 |
| GB | 2265587 A | 10/1993 |
| GB | 2342630 A | 4/2000 |
| GB | 2398048 A | 8/2004 |
| GB | 2398049 A | 8/2004 |
| GB | 2398050 A | 8/2004 |
| JP | 61006458 | 1/1986 |
| JP | 6159491 A | 3/1986 |
| JP | 6385568 U | 6/1988 |
| JP | 01095980 A | 4/1989 |
| JP | 01095981 A | 4/1989 |
| JP | 09267762 A | 10/1997 |
| JP | 09328078 A | 12/1997 |
| JP | 10001063 A | 1/1998 |
| JP | 11124051 A | 5/1999 |
| JP | 11278319 A | 10/1999 |
| JP | 2002012172 A | 1/2002 |
| JP | 2002068032 A | 3/2002 |
| JP | 2003034261 A | 2/2003 |
| JP | 2003148938 A | 5/2003 |
| JP | 3716722 B2 | 11/2005 |
| JP | 2008027138 A1 | 2/2008 |
| JP | 2012105158 A | 5/2012 |
| JP | 2012166647 A | 9/2012 |
| JP | 2014002056 A | 1/2014 |
| WO | 8503263 A1 | 8/1985 |
| WO | 0044605 A1 | 8/2000 |
| WO | 2005005200 A2 | 1/2005 |
| WO | 2005116688 A2 | 12/2005 |
| WO | 2006042665 A1 | 4/2006 |
| WO | 2012059207 A1 | 5/2012 |
| WO | 2012103193 A1 | 8/2012 |

(56) References Cited

FOREIGN PATENT DOCUMENTS

| WO | 2014019730 A1 | 2/2014 |
|---|---|---|
| WO | 2014037500 A1 | 3/2014 |
| WO | 2014070047 A1 | 5/2014 |
| WO | 2014092611 A1 | 6/2014 |
| WO | 2014123575 A1 | 8/2014 |
| WO | 2015074027 A1 | 5/2015 |
| WO | 2015187467 A1 | 12/2015 |
| WO | 2017123880 A1 | 7/2017 |

OTHER PUBLICATIONS

Commonly assigned U.S. Appl. No. 16/294,540, filed Mar. 6, 2019, entitled Trailer Angle Detection Using End-to-End Learning (FOR025 P2142).

"Ford Super Duty: Truck Technologies", Brochure, Sep. 2011, 2 pages.

Kristopher Bunker, "2012 Guide to Towing", Trailer Life, 2012, 38 pages.

A. Gonzalez-Cantos, "Backing-Up Maneuvers of Autonomous Tractor-Trailer Vehicles using the Qualitative Theory of Nonlinear Dynamical Systems," International Journal of Robotics Research, Jan. 2009, vol. 28, 1 page.

L. Chu, Y. Fang, M. Shang, J. Guo, F. Zhou, "Estimation of Articulation Angle for Tractor Semi-Trailer Based on State Observer", ACM Digital Library, ICMTMA '10 Proceedings of the 2010 International Conference on Measuring Technology and Automation, vol. 2, Mar. 2010, 1 page.

M. Wagner, D. Zoebel, and A. Meroth, "Adaptive Software and Systems Architecture for Driver Assistance Systems" International Journal of Machine Learning and Computing, Oct. 2011, vol. 1, No. 4, 7 pages.

F.W. Kienhöfer; D. Cebon, "An Investigation of ABS Strategies for Articulated Vehicles", Cambridge University, Engineering Department, United Kingdom, date unknown, 13 pages.

C. Lundquist; W. Reinelt; O. Enqvist, "Back Driving Assistant for Passenger Cars with Trailer", ZF Lenksysteme GmbH, Schwäbisch Gmünd, Germany, 2006 (SAE Int'l) Jan. 2006, 8 pages.

Zhe Leng; Minor, M., "A Simple Tractor-Trailer Backing Control Law for Path Following", IEEE, Intelligent Robots and Systems (IROS) IEEE/RSJ International Conference, Oct. 2010, 2 pages.

Kinjo, H.; Maeshiro, M.; Uezato, E.; Yamamoto, T., "Adaptive Genetic Algorithm Observer and its Application to Trailer Truck Control System", IEEE, SICE-ICASE International Joint Conference, Oct. 2006, 2 pgs.

J. Roh; H. Lee; W. Chung, "Control of a Car with a Trailer Using the Driver Assistance System", IEEE, International Conference on Robotics and Biomimetics; Phuket, Thailand, Dec. 2011, 6 pages.

A. Gonzalez-Cantos; J.I. Maza; A. Ollero, "Design of a Stable Backing Up Fuzzy Control of Autonomous Articulated Vehicles for Factory Automation", Dept. of Systems Engineering and Automatic Control, University of Seville, Spain, 2001, 5 pages.

Altafini, C.; Speranzon, A.; Wahlberg, B., "A Feedback Control Scheme for Reversing a Truck and Trailer Vehicle", IEEE, Robotics and Automation, IEEE Transactions, Dec. 2001, vol. 17, No. 6, 2 pages.

Zare, A. Sharafi; M. Kamyad, A.V., "A New Approach in Intelligent Trailer Parking", IEEE, 2010 2nd International Mechanical and Electrical Technology (ICMET), Sep. 2010, 1 page.

Tanaka, K.; Sano, M., "A Robust Stabilization Problem of Fuzzy Control Systems and its Application to Backing up Control of a Truck-trailer", IEEE Transactions on Fuzzy Systems, May 1994, vol. 2, No. 2, 1 page.

Sharafi, M. Zare; A. Kamyad; A.V. Nikpoor, S., "Intelligent Parking Method for Truck in Presence of Fixed and Moving Obstacles and Trailer in Presence of Fixed Obstacles: Advanced Fuzzy Logic Technologies in Industrial Applications", IEEE, 2010 International Electronics and Information Engineering (ICEIE), Aug. 2010, vol. 2, 1 page.

Hodo, D. W.; Hung, J.Y.; Bevly, D. M.; Millhouse, S., "Effects of Sensor Placement and Errors on Path Following Control of a Mobile Robot-Trailer System", IEEE, American Control Conference, Jul. 2007, 1 page.

Sharafi, M. Zare; A. Kamyad; A.V. Nikpoor, S., "Intelligent Parking Method for Trailers in Presence of Fixed and Moving Obstacles", IEEE, 2010 3rd International Conference on Advanced Computer Theory and Engineering (ICACTE), Aug. 2010, vol. 6, 1 page.

Chieh Chen; Tomizuka, M., "Steering and Independent Braking Control for Tractor-Semitrailer Vehicles in Automated Highway Systems", IEEE, Proceedings of the 34th IEEE Conference on Decision and Control, Dec. 1995, vol. 2, 1 page.

P. Bolzern, R.M. Desantis, A. Locatelli, "An Input-Output Linearization Approach to the Control of an n-Body Articulated Vehicle", J. Dyn. Sys., Meas., Control, Sep. 2001, vol. 123, No. 3, 3 pages.

Dieter Zöbel, David Polock, Philipp Wojke, "Steering Assistance for Backing Up Articulated Vehicles", Systemics, Cybernetics and Informatics; vol. 1, No. 5, date unknown, 6 pages.

J.R. Billing; J.D. Patten; R.B. Madill, "Development of Configurations for Infrastructure-Friendly Five- and Six-Axle SemiTrailers", National Research Council of Canada and Ontario Ministry of Transportation, date unknown, 11 pages.

Jesus Morales, Anthony Mandow, Jorge L. Martinez, and Alfonso Garcia-Cerezo, "Driver Assistance System for Backward Maneuvers in Passive Multi-Trailer Vehicles", IEEE/RSJ International Conference on Intelligent Robots and Systems (IROS), Oct. 2012, 7 pages.

Cedric Pradalier and Kane Usher, "Experiments in Autonomous Reversing of a Tractor-Trailer System", 6th International Conference on Field and Service Robotics, inria-00195700, Version 1, Dec. 2007, 10 pages.

Andri Riid, Alar Leibak, Ennu Rüstern, "Fuzzy Backing Control of Truck and Two Trailers", Tallinn University of Technology; Tallinn, Estonia, date unknown, 6 pages.

Jane McGrath, "How to Avoid Jackknifing", A Discovery Company, date unknown, 3 pages.

Claudio Altafini, Alberto Speranzon, and Karl Henrik Johansson, "Hybrid Control of a Truck and Trailer Vehicle", Springer-Verlag Berlin Heidelberg, HSCC 2002, LNCS 2289; 2002, 14 pages.

Jujnovich, B.; Roebuck, R.; Odhams, A.; David, C., "Implementation of Active Rear Steering of a Tractor Semitrailer", Cambridge University, Engineering Department; Cambridge, United Kingdom, date unknown, 10 pages.

A.M.C. Odhams; R.L. Roebuck; C. Cebon, "Implementation of Active Steering on a Multiple Trailer Long Combination Vehicle", Cambridge University, Engineering Department; Cambridge, United Kingdom, date unknown, 13 pages.

Cedric Pradalier and Kane Usher, "Robust Trajectory Tracking for a Reversing Tractor-Trailer System", (Draft), Field and Service Robotics Conference, CSIRO ICT Centre, Jul. 2007, 16 pages.

Stahn, R.; Heiserich, G.; Stopp, A., "Laser Scanner-Based Navigation for Commercial Vehicles", IEEE, 2007 IEEE Intelligent Vehicles Symposium, Jun. 2007, 1 page.

Lee Yong H.; Weiwen Deng; Chin Yuen-Kwok Steve; McKay Neil, "Feasibility Study for a Vehicle-Trailer Backing Up Control", Refdoc.fr, SAE Transactions, vol. 113, No. 6, 2004, 1 page.

A.M.C. Odhams; R.L. Roebuck; B.A. Jujnovich; D. Cebon, "Active Steering of a Tractor-Semi-Trailer" Proceedings of the Institution of Mechanical Engineers, Part D: Journal of Automobile Engineering, SAGE Journals, vol. 225, No. 7, Jul. 2011, 1 page.

Haviland, G S, "Automatic Brake Control for Trucks—What Good Is It?", TRID, Society of Automotive Engineers, Sep. 1968, 1 page.

William E. Travis; David W. Hodo; David M. Bevly; John Y. Hung, "UGV Trailer Position Estimation Using a Dynamic Base RTK System", American Institute of Aeronautics and Astronautics, date unknown, 12 pages.

"VSE Electronic Trailer Steering", ETS for Trailers, version 2009, VSE Trailer Systems B.V., 2009, 28 pages.

"Telematics Past, Present, and Future," Automotive Service Association, www.ASAshop.org, May 2008, 20 pages.

"Fully Automatic Trailer Tow Hitch With LIN Bus," https://webista.bmw.com/webista/show?id=1860575499&lang=engb&print=1, date unknown, 5 pages.

(56) References Cited

OTHER PUBLICATIONS

"VBOX Yaw Rate Sensor With Integral Accelerometers," Racelogic, www.racelogic.co.uk, date unknown, 2 pages.

P.D.C.R Jayarathna; J.V Wijayakulasooriya; S.R Kodituwakku, "Fuzzy Logic and Neural Network Control Systems for Backing up a Truck and a Trailer", International Journal of Latest Trends in Computing, vol. 2, No. 3, Sep. 2011, 8 pages.

Olof Enqvist, "AFS-Assisted Trailer Reversing," Institutionen for systemteknik Deartment of Electrical Engineering, Jan. 27, 2006, 57 pages.

SH. Azadi, H.R. Rezaei Nedamani, and R. Kazemi, "Automatic Parking of an Articulated Vehicle Using ANFIS", Global Journal of Science, Engineering and Technology (ISSN: 2322-2441), 2013, pp. 93-104, Issue No. 14.

F. Cuesta and A. Ollero, "Intelligent System for Parallel Parking of Cars and Tractor-Trailers", Intelligent Mobile Robot Navigation, STAR, 2005, pp. 159-188, Springer-Verlag Berlin Heidelberg.

\* cited by examiner

TRAILER ANGLE DETECTION USING END-TO-END LEARNING

FIELD OF THE INVENTION

The present invention generally relates to trailer backup assist systems, and, more particularly, to trailer backup assist systems employing trailer angle detection through image processing.

BACKGROUND OF THE INVENTION

Reversing a vehicle while towing a trailer can be challenging for many drivers, particularly for drivers that drive with a trailer on an infrequent basis or with various types of trailers. Some systems used to assist a driver in backing a trailer rely on trailer angle measurements to determine the position of the trailer relative to the vehicle. Thus, the accuracy and reliability of the trailer angle measurements can be critical to the operation of the trailer backup assist system.

SUMMARY OF THE INVENTION

According to one aspect of the present invention, a trailer angle identification system is disclosed. The system comprises an imaging device configured to capture an image. An angle sensor is configured to measure a first angle of the trailer relative to a vehicle. A controller is configured to process the image in a neural network and estimate a second angle of the trailer relative to the vehicle based on the image. The controller is further configured to train the neural network based on a difference between the first angle and the second angle.

The system may further comprise one or more of the following elements alone or in various combinations. The additional elements may include the following:
  the controller is further configured to label the image with the angle as an input to the neural network;
  the controller is further configured to train the neural network to identify an actual angle between the vehicle and the trailer based on the image without the first angle from the angle sensor;
  the training may comprise identifying an error between the first angle and the second angle;
  the imaging device is configured to capture the image in a field of view directed at a connection interface of the trailer to the vehicle;
  the controller is further configured to capture a plurality of images with the imaging device and estimating the second angle over a range of trailer angles between the trailer and the vehicle;
  the controller is further configured to compare the second angle estimated in the plurality of images to the first angle measured by the angle sensor;
  the controller is further configured to identify an error associated with each of the images based on the comparison; and/or
  the controller is further configured to identify at least one of the trailer angle, an environmental condition, and a lighting condition associated with the error.

According to another aspect of the present invention, a method identifying a trailer angle between a vehicle and a trailer is disclosed. The method comprises capturing a plurality of images in a field of view and detecting a first angle with an angle sensor in connection the vehicle or trailer. The method further comprises processing the images in a neural network and estimating a second angle of the interface based on each of the images. The method further comprises training the neural network based on the first angle and the second angle for each of the images.

The method may further comprise one or more of the following steps alone or in various combinations. The additional steps of the method may include the following:
  a connection interface between the vehicle and the trailer forms an interface and the angle sensor is configured to communicate an electronic signal to a controller based on the trailer angle formed by the interface;
  the field of view is directed at an interface of the trailer to the vehicle;
  cropping the images based on a location of the interface in the field of view;
  the training comprises identifying an error between the first angle and the second angle for each of the images;
  the training further comprises identifying at least one of the trailer angle, an environmental condition, and a lighting condition associated with the error for each of the images;
  the training further comprises capturing additional images based on at least one of the trailer angle, the environmental condition, and the lighting condition associated with the error;
  the training further comprises processing the additional images with the neural network thereby improving the estimation of the second angle by updating the parameters of the neural network; and/or
  the training further comprises training the neural network to accurately estimate the trailer angle based on the images without the first angle from the angle sensor.

According to yet another aspect of the present invention, a trailer angle identification system is disclosed. The system comprises an imaging device configured to capture an image. An angle sensor is configured to measure a first angle of the trailer relative to a vehicle. A controller is configured to crop the image generating a cropped image based on a location of an interface between the vehicle and the trailer in the image. The controller is further configured to process the cropped image in a neural network and estimate a second angle of the trailer relative to the vehicle based on the image. The controller is further configured to train the neural network based on a difference between the first angle and the second angle, wherein the training is configured to train the neural network to identify an actual angle between the vehicle and the trailer based on the image without the first angle from the angle sensor. The system may further comprise the imaging device configured to capture the image in a field of view directed at a connection interface of the trailer to the vehicle.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

For purposes of description herein, it is to be understood that the disclosed trailer backup assist system and the related methods may assume various alternative embodiments and orientations, except where expressly specified to the contrary. It is also to be understood that the specific devices and processes illustrated in the attached drawings, and described in the following specification, are simply exemplary embodiments of the inventive concepts defined in the appended claims. While various aspects of the trailer backup assist system and the related methods are described with reference to a particular illustrative embodiment, the disclosed invention is not limited to such embodiments, and additional modifications, applications, and embodiments may be implemented without departing from the disclosed invention. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
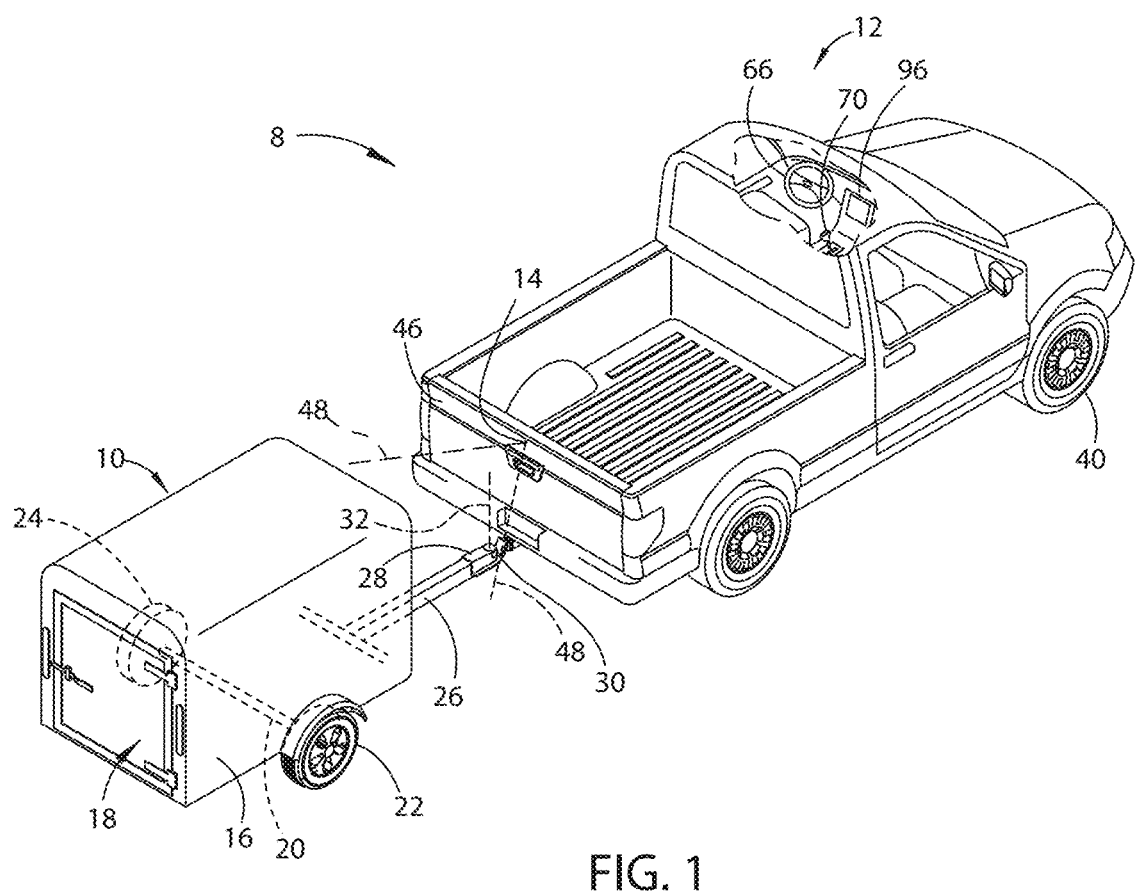
FIG. 1 is a top perspective view of a vehicle attached to a trailer with one embodiment of a trailer angle sensor for operating a trailer backup assist system.
Figure 2:
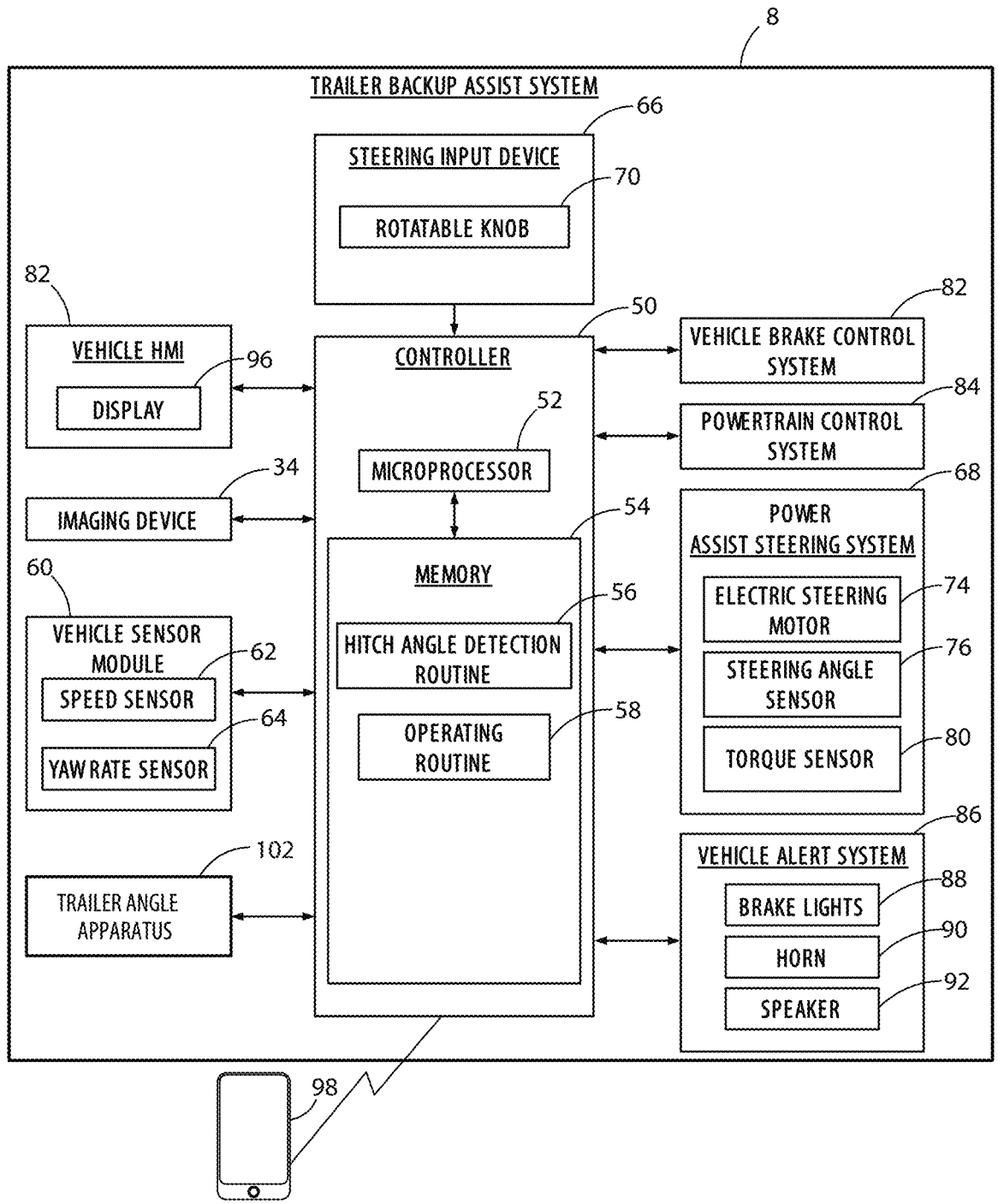
FIG. 2 is a block diagram illustrating one embodiment of the trailer backup assist system.
Figure 3:
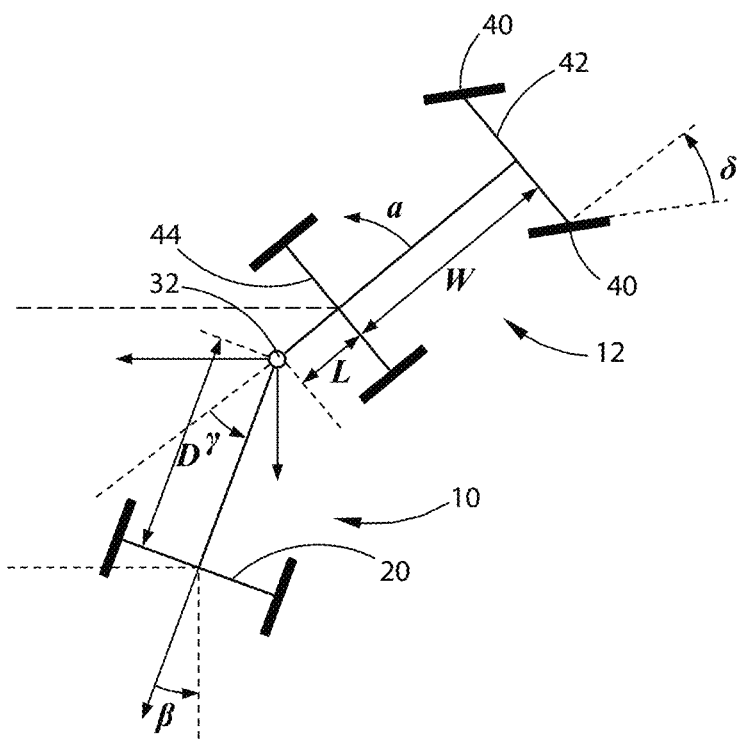
FIG. 3 is a kinematic model of the vehicle and trailer shown in FIG. 1.

Referring to FIGS. 1, 2, and 3, reference numeral 10 generally designates a trailer backup assist system for controlling a backing path of a trailer 10 attached to a vehicle 12. The system may allow a driver of the vehicle 12 to specify a desired curvature of the backing path of the trailer 10. In order to achieve such operation, a trailer angle γ (shown in FIG. 3) between the vehicle 12 and the trailer 10 may be monitored to provide feedback to the system 8 throughout operation. However, accurately detecting the trailer angle γ may be challenging when considering the wide variations in trailer hitch types, weather-related visibility conditions, lighting conditions, trailer angle ranges, and various additional variables that may cause variations in measurement. In order to improve the reliability of identifying the trailer angle γ, the disclosure provides for an improved system and method for end-to-end learning to identify a trailer angle γ.

In particular, the disclosure provides for the detection of the trailer angle γ based on the image data captured by an imaging device 14. Based on the image data captured by the imaging device 14, the system 8 may identify various characteristics of the trailer 10 based on a variety of image processing techniques (e.g. edge detection, background subtraction, template matching etc.). However, due to variations related in the trailer 10 and the local environment (e.g. shadows, textured surfaces, noise, etc.), conventional image processing techniques may not be sufficiently robust to reliably and accurately monitor the trailer angle γ without the aid of additional sensors.

As discussed herein, the improved systems and methods may utilize neural networks to improve the reliability and accuracy of the identified trailer angle γ to improve operation of the system 8. The neural networks and related methods may be configured to learn how to accurately detect the trailer angle γ without human intervention such that the resulting neural network may accurately identify the trailer angle solely based on image data acquired from the imaging device 14. Accordingly, the methods and systems discussed herein, may detect the trailer angle γ reliably without the aid of additional sensors, patterned markers or visual cues, or other aids that may otherwise be required to enable accurate operation of the system 8.

As further discussed in reference to FIGS. 3-6, the invention disclosure provides a solution for the detection of the trailer angle γ based on deep learning and convolutional networks. In this way, the system 8 may reliably estimate the trailer angle γ based on an end-to-end approach for angle estimation utilizing only the existing backup camera (e.g. imaging device 14 of the vehicle 12). As discussed herein, the deep neural networks provided for the detection of the trailer angle γ may contain thousands or millions of tunable parameters. Based on these parameters, the system 8 may accurately represent highly non-linear models while being very robust to noise. In some embodiments, convolutional layers may be trained to detect diverse features, similarly to human perception as such networks are capable of generalizing scenarios for later detection.

A drawback related to the implementation of deep convolution neural networks may include the labor intensive involvement from human operators. For example, in order to provide feedback to the network, a human operator may be required to label and review thousands of samples to ensure accurate learning and operation of the network. Accordingly, in addition to providing the application of neural networks to identify the trailer angle γ, the disclosure also provides for methods of programming and training the neural networks discussed herein. These and other aspects of the disclosure are further detailed in the following description.

Referring still to FIGS. 1, 2, and 3, the vehicle 12 is embodied as a pickup truck that is pivotally attached to one embodiment of the trailer 10. The trailer 10 may comprise a box frame 16 with an enclosed cargo area 18. An axle 20 of the trailer may be operably coupled to wheels 22 and 24, and a tongue 26 may extend longitudinally forward from the enclosed cargo area 18. The illustrated trailer 10 comprises a trailer hitch connector in the form of a coupler assembly 28. The coupler assembly 28 is connected to a vehicle 12 via a hitch ball 30, which may be connected to the vehicle 12 by a drawbar. In operation, the coupler assembly 28 may latch onto the hitch ball 30 to provide a pivoting hitch point 32 that allows for articulation of the trailer angle γ between the vehicle 12 and the trailer 10.

As shown in FIG. 3, the trailer angle γ is shown in relation to a number of parameters of the vehicle 12 and the trailer 10. In operation, the kinematic model depicted in FIG. 3 may be utilized as the basis for the system 8 to control the navigation of the vehicle 12 to direct the trailer 10 along a calculated path. During such operations, the system 8 may monitor the trailer angle γ to ensure that the trailer 10 is accurately guided by the vehicle 12. The parameter that may be utilized for the model include, but are not limited to, the following:

δ: steering angle at steered wheels 40 of the vehicle 12;
α: yaw angle of the vehicle 12;
β: yaw angle of the trailer 10;
γ: trailer angle between the vehicle 12 and the trailer 10 (γ=β−α);
W: wheelbase length between a front axle 42 and a rear axle 44 of the vehicle 12;
L: drawbar length between the hitch point 32 and the rear axle 44 of the vehicle 12; and
D: trailer length between the hitch point 32 and axle 20 of the trailer 10 or effective axle for multiple axle trailers.

It should be appreciated that additional embodiments of the trailer 10 may alternatively couple with the vehicle 12 to provide a pivoting connection, such as by connecting with a fifth wheel connector. It is also contemplated that additional embodiments of the trailer 10 may include more than one axle and may have various shapes and sizes configured for different loads and items, such as a boat trailer or a flatbed trailer.

In some embodiments, the trailer backup assist system 8 may also include the imaging device 14 located at the rear of the vehicle 12 and configured to image a rear-vehicle scene. The imaging device 14 may be centrally located at an upper region of a vehicle tailgate 46 such that the imaging device 14 is elevated relative to the tongue 26 of the trailer 10. The imaging device 14 has a field of view 48 located and oriented to capture one or more images that may include the tongue 26 of the trailer 10 and the hitch ball 30, among other things. Captured images or image data may be supplied to a controller 50 of the trailer backup assist system 8. As discussed herein, the image data may be processed by the controller 50 to determine the trailer angle γ between the vehicle 12 and the trailer 10.

Referring now to FIG. 2, the controller 50 may comprise a microprocessor 52 and/or other analog and/or digital circuitry for processing one or more logic routines stored in a memory 54. The logic routines may include one or more trailer angle detection routines 56, which may comprise one or more deep learning neural networks as well as operating routines 58, which may be configured to guide the vehicle 12. Information from the imaging device 14 or other components of the trailer backup assist system 8 may be supplied to the controller 50 via a communication network of the vehicle 12, which can include a controller area network (CAN), a local interconnect network (LIN), or other conventional protocols used in the automotive industry. It should be appreciated that the controller 50 may be a stand-alone dedicated controller or may be a shared controller integrated with the imaging device 14 or other component of the trailer backup assist system 8 in addition to any other conceivable onboard or off-board vehicle control systems.

In an exemplary embodiment, the controller 50 of the trailer backup assist system 8 may be configured to communicate with a variety of vehicle equipment. The trailer backup assist system 8 may include a vehicle sensor module 60 that monitors certain dynamics of the vehicle 12. The vehicle sensor module 60 may generate a plurality of signals that are communicated to the controller 50 and may include a vehicle speed signal generated by a speed sensor 62 and a vehicle yaw rate signal generated by a yaw rate sensor 64. A steering input device 66 may be provided to enable a driver to control or otherwise modify the desired curvature of the backing path of the trailer 10.

The steering input device 66 may be communicatively coupled to the controller 50 in a wired or wireless manner. In this configuration, steering input device 66 may provide the controller 50 with information defining the desired curvature of the backing path of the trailer 10. In response, the controller 50 may process the information and generate corresponding steering commands that are supplied to a power assist steering system 68 of the vehicle 12. In some embodiments, the steering input device 66 may comprise a rotatable knob 70 operable to rotate to positions that may correspond to an incremental change to the desired curvature of a backing path of the trailer 10.

According to some embodiments, the controller 50 of the trailer backup assist system 8 may control the power assist steering system 68 of the vehicle 12 to operate the steered wheels 40 to direct the vehicle 12 in such a manner that the trailer 10 reacts in accordance with the desired curvature of the backing path of the trailer 10. The power assist steering system 68 may be an electric power-assisted steering (EPAS) system that includes an electric steering motor 74 for turning the steered wheels 40 to a steering angle δ based on a steering command generated by the controller 50. In this configuration, the steering angle δ may be sensed by a steering angle sensor 76 of the power assist steering system 68 and provided to the controller 50. The steering command may be provided for autonomously steering the vehicle 12 during a backup maneuver and may alternatively be provided manually via a rotational position (e.g., a steering wheel angle) of the steering input device wheel 66 or the rotatable knob 70.

In some embodiments, the steering input device 66 (e.g. steering wheel) of the vehicle 12 may be mechanically coupled with the steered wheels 40 of the vehicle 12, such that the steering input device 66 may move in concert with steered wheels 40 via an internal torque, thereby preventing manual intervention with the steering input device 66 during autonomous steering of the vehicle 12. In such instances, the power assist steering system 68 may include a torque sensor 80 that senses torque (e.g., gripping and/or turning) on the steering input device 66, which may not be expected from autonomous control of the steering input device 66. Such unexpected torque may be detected by the controller 50 to indicate manual intervention by the driver. In some embodiments, external torque applied to the steering input device 66 may serve as a signal to the controller 50 that the driver has taken manual control and for the trailer backup assist system 8 to discontinue autonomous steering functionality.

The controller 50 of the trailer backup assist system 8 may also communicate with a vehicle brake control system 82 of the vehicle 12 to receive vehicle speed information, such as individual wheel speeds of the vehicle 12. Additionally or alternatively, vehicle speed information may be provided to the controller 50 by a powertrain control system 84 and/or the speed sensor 62, among other conceivable means. It is conceivable that individual wheel speeds may be used to determine a vehicle yaw rate, which can be provided to the controller 50, in the alternative or in addition, to the vehicle yaw rate measured by the yaw rate sensor 64 of the vehicle sensor module 60. In some embodiments, the controller 50 may provide braking commands to the vehicle brake control system 82, thereby allowing the trailer backup assist system 8 to regulate the speed of the vehicle 12 during a backup maneuver of the trailer 10. It should be appreciated that the controller 50 may additionally or alternatively regulate the speed of the vehicle 12 via interaction with the powertrain control system 84.

Through interaction with the power assist steering system 68, the vehicle brake control system 82, and/or the powertrain control system 84 of the vehicle 12, the potential for unacceptable trailer backup conditions can be reduced. Examples of unacceptable trailer backup conditions include, but are not limited to, a vehicle over-speed condition, a high trailer angle rate, trailer angle dynamic instability, a trailer jackknife condition, sensor failure, and the like. In such circumstances, the driver may be unaware of the failure until the unacceptable trailer backup condition is imminent or already happening. In order to avoid such conditions, the controller 50 may be configured to accurately monitor the trailer angle γ thereby providing feedback to ensure accurate operation.

According to some embodiments, the controller 50 may communicate with one or more devices, including a vehicle alert system 86, which may prompt visual, auditory, and tactile warnings. For instance, vehicle brake lights 88 and vehicle emergency flashers may provide a visual alert and a vehicle horn 90 and/or speaker 92 may provide an audible alert. Additionally, the controller 50 and/or vehicle alert system 86 may communicate with a human machine interface (HMI) 84 of the vehicle 12. The HMI 84 may include a touchscreen vehicle display 96, such as a center-stack mounted navigation or entertainment display capable of displaying images indicating the alert. Such an embodiment may be desirable to notify the driver of the vehicle 12 that an unacceptable trailer backup condition is occurring. Further, it is contemplated that the controller 50 may communicate via wireless communication with one or more electronic portable devices, such as portable electronic device 98, which is shown embodied as a smartphone. The portable electronic device 98 may include a display for displaying one or more images and other information to a user. In response, the portable electronic device 98 may provide feedback information, such as visual, audible, and tactile alerts.

Figure 4:
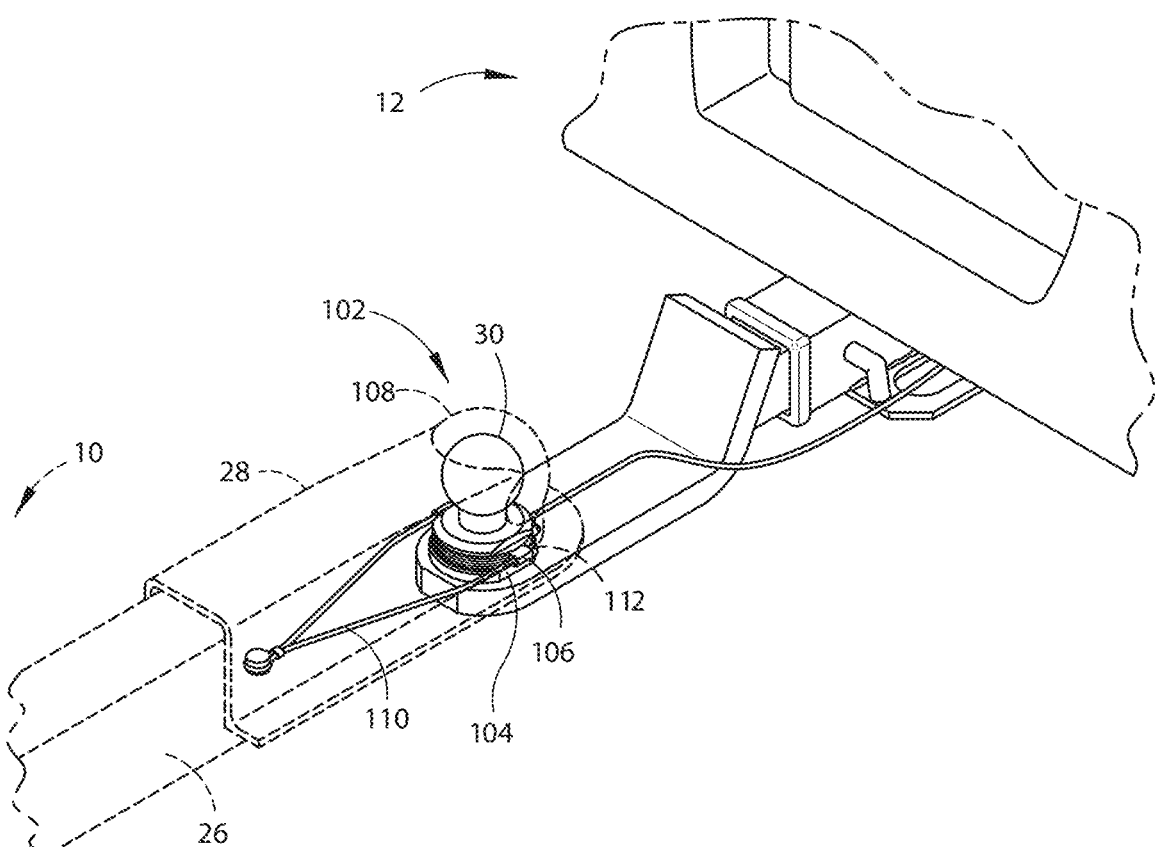
FIG. 4 is a detailed schematic diagram of a connection interface between a vehicle and a trailer demonstrating a trailer angle sensor.

Referring now to FIGS. 2 and 4, the system 8 may further comprise a trailer angle detection apparatus 102. As previously discussed, the system 8 may be configured to learn or program parameters of the neural network without intervention from a human operator. Accordingly, the system 8 may be configured to measure the trailer angle γ with the trailer angle detection apparatus 102 in order to validate a determination of the hitch angle γ identified from the image data captured by the imaging device 14. In this way, the system 8 may identify the hitch angle γ from the image data and automatically label the associated image with the hitch angle γ identified by the trailer angle detection apparatus 102. Accordingly, the system 8 may collect the video data automatically to train the neural network without requiring interaction from a human user.

In general, the trailer angle detection apparatus 102 may be utilized by the controller 50 to train the neural network of the hitch angle detection routine 56. Accordingly, the trailer angle detection apparatus 102 may only be required for initial training stages of the neural network in order to generate labels identifying the trailer angle γ for each image or at least a sample of images captured by the imaging device 14. Accordingly, the hitch angle detection routine 56 may be trained by the system 8 by utilizing the trailer angle γ detected by the trailer angle detection apparatus 102. However, once the neural network is trained such that the trailer angle γ can successfully be identified by the hitch angle detection routine 56 within an acceptable or predetermined level of error, the system 8 may be configured to utilize the neural network to detect the trailer angle γ by utilizing only the image data captured by the imaging device 14.

In an exemplary embodiment, the trailer angle detection apparatus 102 may comprise a housing 104 fixed to the hitch ball 30 on the vehicle 12. An element 106 attached to the trailer 10 may rotate relative to the housing 104 about an axis 108 defined by the hitch ball 30. A connecting member 110 may secure the element 106 to the trailer 10 for rotating the element 106 in conjunction with angular movement of the trailer 10. A sensor 112 may be configured to detect rotational movement of the element 106 for determining the trailer angle γ. It is contemplated that the element 106 in other embodiments may be alternatively secured to the trailer 10 to rotate the element 106 relative to the sensor 112 upon angular movement of the trailer 10.

In various embodiments, the sensor 112 may be referred to as the hitch angle sensor 112 and may be implemented by utilizing a variety of sensors. For example, the hitch angle sensor 112 may be implemented as a proximity sensor, a potentiometer, Hall Effect sensor, encoder, or various other forms of sensors that may be configured to measure the rotation of the trailer 10 relative to the vehicle 12. As shown in FIG. 4, the trailer angle detection apparatus 102 is shown attached to the hitch ball 30. However, it is conceivable that the trailer 10 may include an alternative assembly to the coupler assembly 28 shown and the vehicle 12 may include an alternative hitch connector. For example, the system 8 may be implemented with a fifth wheel connection, a European-style hitch ball, or other conceivable configurations without departing from the spirit of the disclosure.

Figure 5A:
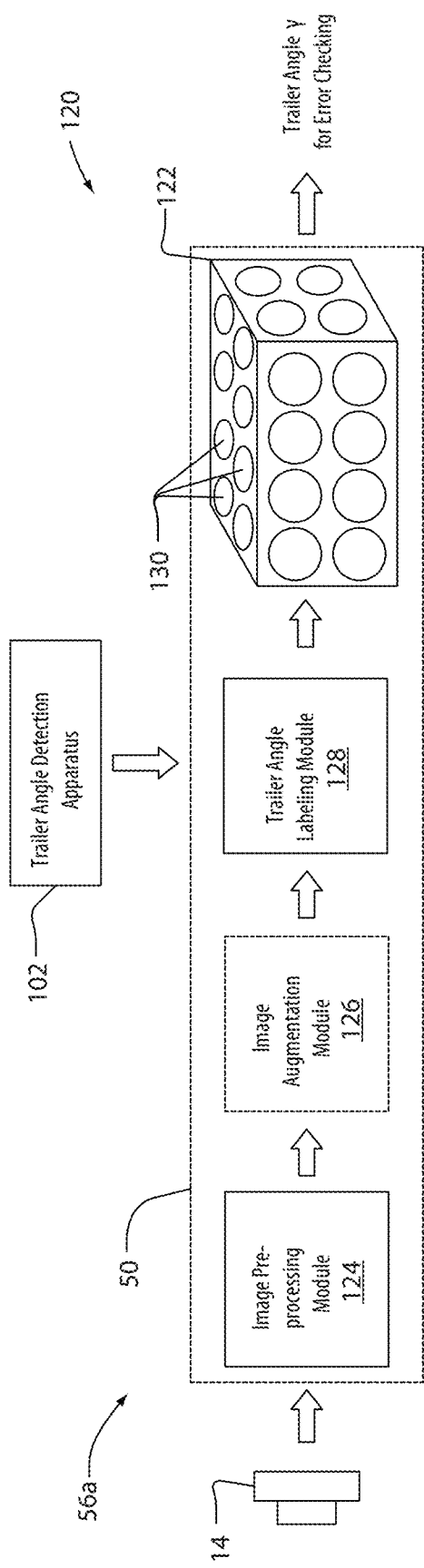
FIG. 5A is a process diagram of a training process for a neural network configured to estimate an angle between a vehicle and a trailer.
Figure 5B:
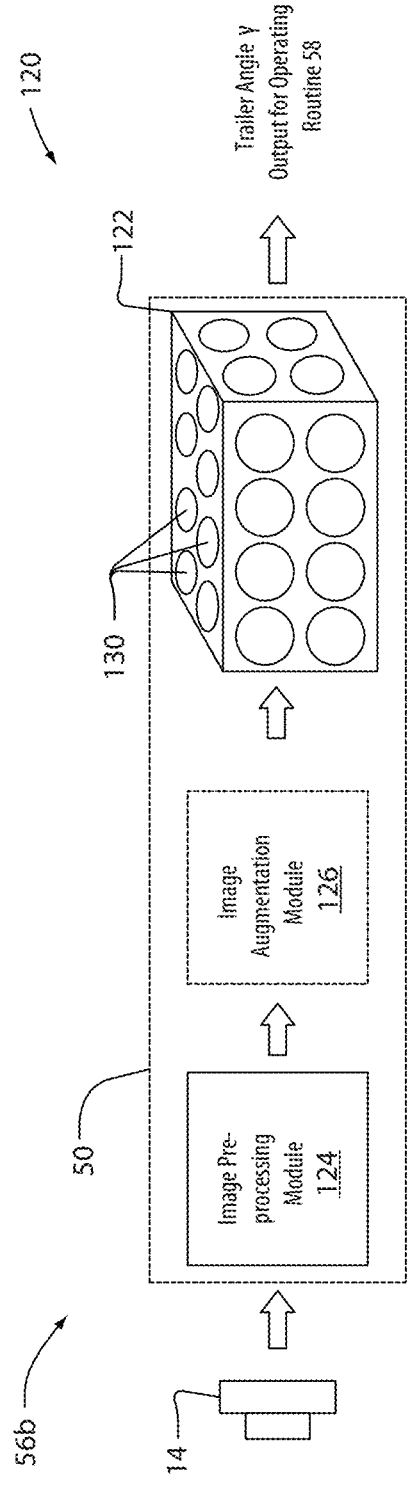
FIG. 5B is a process diagram of an operating process for a neural network configured to estimate an angle between a vehicle and a trailer.

Referring now to FIGS. 5A and 5B, an exemplary process diagram 120 of the trailer angle detection routine 56 is shown. As previously discussed, the trailer angle detection apparatus 102 may be utilized by the controller 50 to train the neural network 122 of the hitch angle detection routine 56. Accordingly, the trailer angle detection apparatus 102 may only be required for initial training stages of the neural network 122 in order to generate labels identifying the trailer angle γ for each image or at least a sample of images captured by the imaging device 14. Accordingly, once the neural network 122 is trained such that the trailer angle γ can successfully be identified by the hitch angle detection routine 56 within an acceptable or predetermined level of error, the system 8 may be configured to utilize the neural network 122 to detect the trailer angle γ by utilizing only the image data captured by the imaging device 14.

In reference to the FIGS. 5A and 5B, the hitch angle detection routine 56 will be described in reference to a training process 56a and an operating process 56b. The training process 56a may utilize the trailer angle γ from the trailer angle detection apparatus 102 to train the neural network 122 to accurately identify the trailer angle γ from only the image data from the imaging device 14. Accordingly, once trained, the operating process 56b may be configured to detect the trailer angle γ without data provided by the trailer angle detection apparatus 102. In some embodiments, the processing requirements and steps necessary to accomplish the training process 56a may be more rigorous and/or demanding with regard to the processing capability of the controller 50. Accordingly, the processing steps for the training process 56a may be completed by a system comprising increased processing capacity or processing power. For example, the controller 50 utilized for the training process 56a may be configured to have more capable image processing engines, processors capable of increased processing speeds, and generally more advanced system architecture than the controller 50 utilized for the operating process 56b. In this way, the system 8 may be effectively designed to promote economical manufacturing of the system 8 for training embodiments as well as operating embodiments, which may be incorporated in consumer products (e.g. the vehicle 12).

Referring first to the training process 56a, the microprocessor 52 or, more generally, the controller 50 may first receive image data from the imaging device 14. The controller 50 may first process the image data via a pre-processing module 124. The pre-processing module 124 may be configured to crop each image frame received from the imaging device 14. The cropping of the image data may be consistently processed based on the positional relationship of the hitch ball 30 in the field of view 48. For example, the hitch ball 30 may be registered or identified during an initial connection or setup of the hitch ball 30 with the vehicle 12. Once identified, the controller 50 may be configured to crop the image data from the imaging device 14 based on predetermined extents or a portion of the image data designated in relation to the location of the hitch ball 30 in the field of view 48. In this way, the image data supplied to the neural network 122 may be limited in positional variation and quality that may be apparent in raw data received from the imaging device 14.

In some embodiments, the controller 50 may further be configured to process the data via an image augmentation module 126. The image augmentation module 126 may be configured to augment the image data by a variety of techniques. For example, the cropped image data received from the image pre-processing module 124 may be augmented by the image augmentation module 126 by various techniques including, but not limited to, flipping, rotating, translating, scaling, color enhancing, histogram stretching, noise filtering, selective noise inclusion, etc. Following processing of the image data via the image pre-processing module 124 and/or the image augmentation module 126, the controller 50 may utilize the trailer angle γ to label each frame of the image data via a trailer angle labeling module 128. Effectively, the trailer angle labeling module 128 may be implemented as a data attributed to each of the frames of the image data that may be input into the neural network 122. In this way, the training process 56a may provide for the image data from the imaging device 14 to be processed and input into the neural network 122 with the trailer angle γ of each image frame identified in order to train the parameters of the neural network 122 to accurately identify the trailer angle γ from only the image data.

Once the image data is received by the neural network 122, a deep learning procedure may be implemented to regress or estimate the trailer angle γ. For example, the neural network 122 may be implemented as a deep convolutional network. The architecture of the neural network 122 may be a plurality of convolutional networks followed by activation functions. To help avoiding overfitting, dropout layers and other regularization techniques may be implemented. In an exemplary embodiment, fully connected layers at the end of the neural network 122 are responsible identifying that outputting the trailer angle γ. Since the object of the neural network 122 may be to perform a regression task, an activation function may not be utilized at the output.

In general, the neural network 122 may comprise a plurality of neurons 130, which may be arranged in a three-dimensional array comprising a width, a depth, and a height. The arrangement of the neurons 130 in this configuration may provide for each layer (e.g. dimensional cross-section of the array) to be connected to a small portion of the preceding layer. In this way, the network 122 may process the data through regression to reduce each image to a single vector to identify the trailer angle γ. In this way, the neural network 122 may transform each frame of the image data layer by layer from original pixel values to the final output. In general, the specific architecture of the neural network 122 may vary and as may be understood by those having ordinary skill in the art, the training process 56a may begin with a pre-trained model. In this way, the training process 56a may be utilized to fine-tune the pre-trained, convolutional neural network to accurately detect the trailer angle γ from the image data captured by the imaging device 14. Examples of pre-trained models that may be implemented for the training process 56a may include, but are not limited to, the following: LeNet, AlexNet, ZF Net, GoogLeNet, VGGNet, ResNet, etc.

Referring now to FIG. 5B, once the neural network 122 is trained, the operating process 56b of the hitch angle identification routine 56 may be processed without the need of the trailer angle γ from the trailer angle detection apparatus 102. Accordingly, the operation of the operating process 56b may be limited relative to the training process 56a. For example, the controller 50 may similarly process the image data via a pre-processing module 124. The pre-processing module 124 may be configured to crop each image frame received from the imaging device 14 based on the positional relationship of the hitch ball 30 in the field of view 48. Next, the controller 50 may process the cropped image data via an image augmentation module 126 as previously discussed. The result of the steps completed by the pre-processing module 124 and/or the augmentation module 126 may generate normal image data that may be more uniform than the image data received directly from the imaging device 14. Such uniformity in proportions in relation to the hitch-ball 30 and image quality (e.g. contrast, noise, etc.) may provide for the trailer angle identification routine 56 to improve the successful identification of the trailer angle γ in the image data without requiring the secondary measurements available from the trailer angle detection apparatus 102 in the training process 56a. Accordingly, the disclosure may provide for improved operation and accuracy of the system 8 based on both the image processing steps provided by the modules 124, 126 and the utilization of the neural network 122.

As previously discussed, the neural network 122 may be configured to receive the image data from the pre-processing module 124 and/or the augmentation module 126. Upon completion of the analysis of each frame of the image data, the controller 50 may output the corresponding trailer angle γ as shown in FIGS. 7A, 7B, 7C, and 8. Accordingly, the systems and methods described herein may provide for the training and physical implementation of the system 8 that may effectively train the neural network 122 such that the trailer angle γ may be accurately identified in a variety of environmental conditions, lighting conditions, and for a variety of trailer topographies and orientations.

Figure 6:
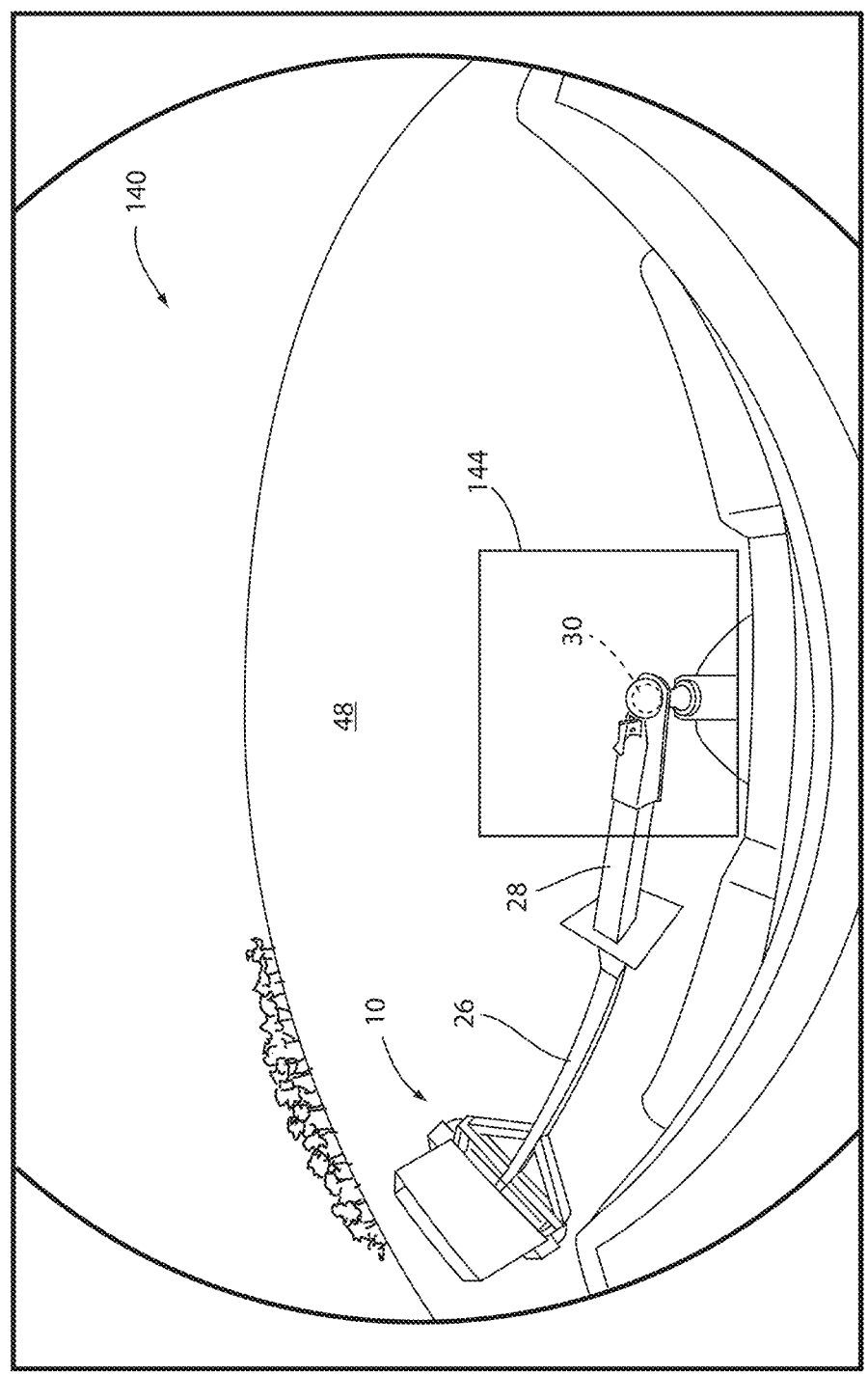
FIG. 6 is a diagram of image data captured by a reverse camera of a vehicle demonstrating a region of interest of a connection interface between a vehicle and a trailer.
Figure 7C:
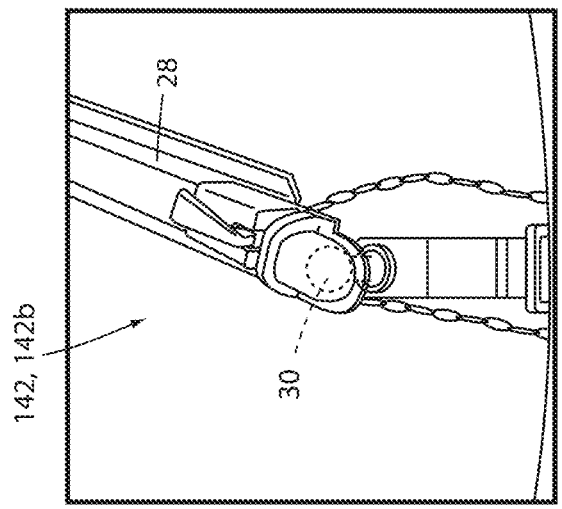
FIG. 7C is an example of a cropped image configured as an input to a neural network.
Figure 7B:
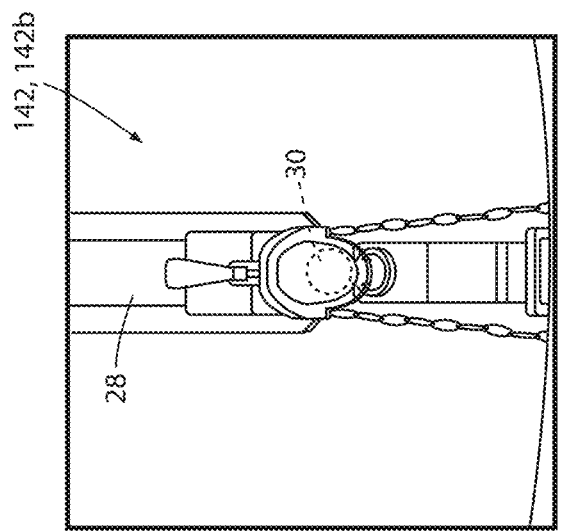
FIG. 7B is an example of a cropped image configured as an input to a neural network.
Figure 7A:
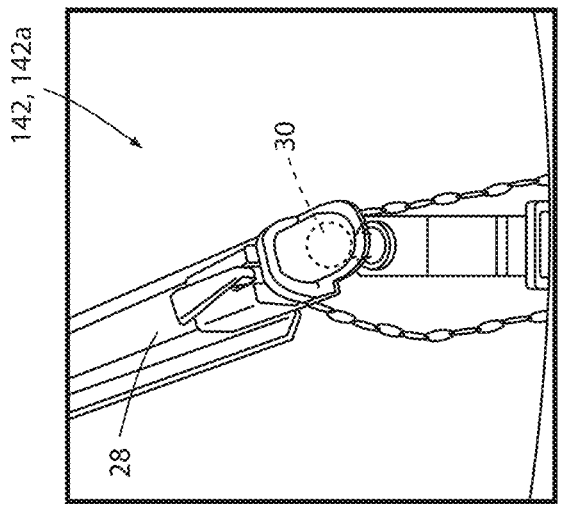
FIG. 7A is an example of a cropped image configured as an input to a neural network.

Referring now to FIG. 6, an example of the image data 140 received from the imaging device 14 by the controller 50 is shown. Additionally, FIGS. 7A, 7B, and 7C demonstrate the cropped image data 142a, 142b, and 142c. The cropped image data 142 represents the input provided to the neural network 122 that has been cropped based on the cropping extents demonstrated as the boundary outline 144 shown in FIG. 6. As previously discussed, the cropped image data 142 may be generated by the pre-processing module 124 and/or the augmentation module 126 based on a fixed or identified relationship of the hitch-ball 30 within field of view 48. In this way, the image data supplied to the neural network 122 may be limited in positional variation and quality that may be apparent in raw data received from the imaging device 14.

Figure 8C:
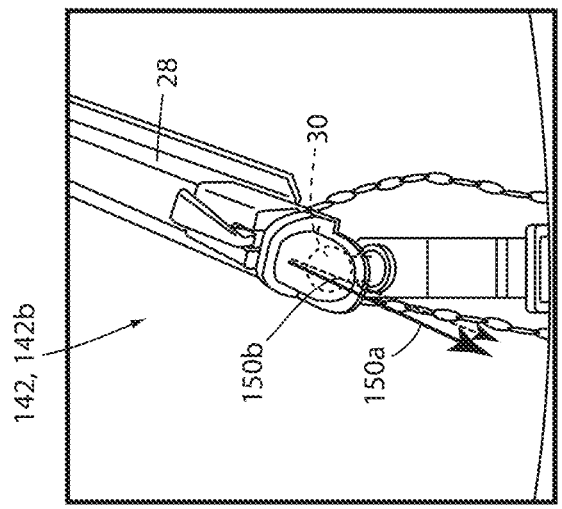
FIG. 8C is an example of a cropped image comprising a trailer vector indicating an estimation of a trailer angle.
Figure 8B:
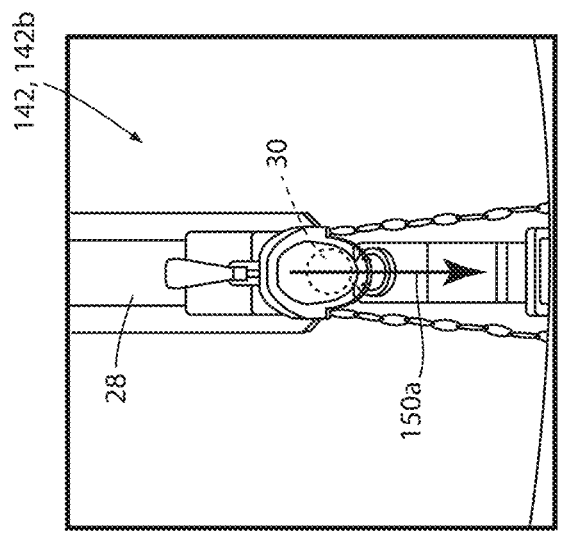
FIG. 8B is an example of a cropped image comprising a trailer vector indicating an estimation of a trailer angle.
Figure 8A:
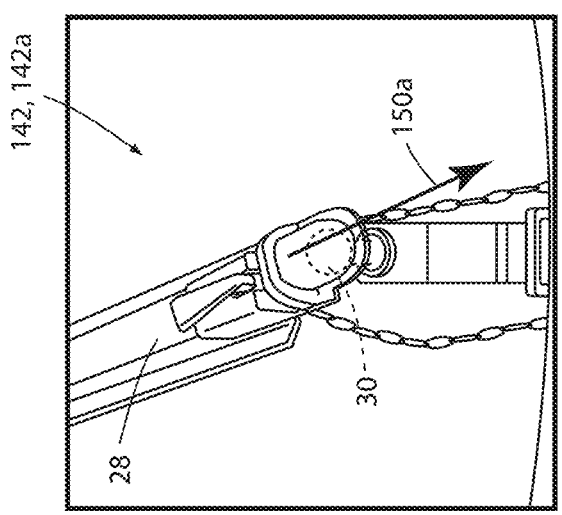
FIG. 8A is an example of a cropped image comprising a trailer vector indicating an estimation of a trailer angle.

As shown, FIGS. 8A, 8B, and 8C, the cropped image data 142 supplied to the neural network 122 is shown with the detected trailer vector 150a shown as a solid line with an arrow-head identifying a heading direction of the trailer 10. Additionally, FIG. 8C demonstrates a measured trailer vector 150b shown as a broken or dashed line with an arrow-head. The measured trailer vector 150b may not be shown in FIGS. 8A and 8B because it is hidden by the detected trailer vector 150a because they are very similar. However, if there is an error or difference between the detected trailer vector 150a and the measured trailer vector 150b, the difference may be identified by the controller 50. Accordingly, based on the error, the system 8 may identify one or more factors related to the image data 142 and/or the trailer angle γ that may have caused the error.

For example, the controller 50 may be configured to group image data based on the error in order to identify trailer angles γ or environmental conditions that lead to the error between the detected trailer vector 150a and the measured trailer vector 150b. In this way, the system may be configured to detect ranges of trailer angles and categories of lighting/environmental conditions that lead to inaccurate identification of the detected trailer vector 150a. Based on the error identified in the categories and/or ranges, the system 8 may identify image data that needs to be captured to improve the training of the neural network 122. Accordingly, the system 8 may be configured to utilize additional image samples and test images to improve the accuracy of the detection of the trailer angle γ to apply deep learning to complete the training process 56a of the neural network 122.

Figure 9:
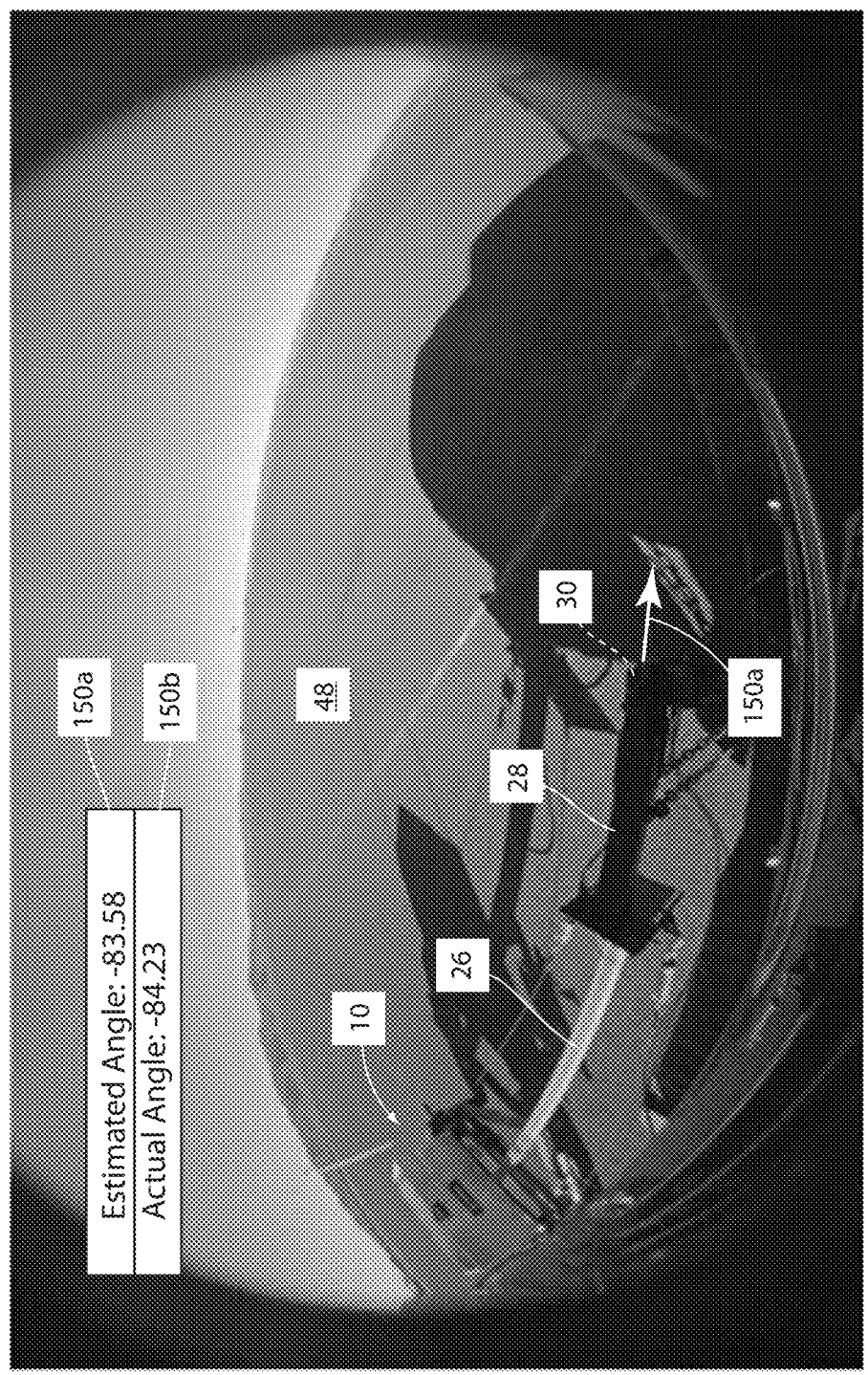
FIG. 9 is an image captured by a reverse camera of a vehicle indicating an estimation of a trailer angle.

Referring now to FIG. 9, an additional example of image data 160 captured by the imaging device 14 is shown. The image data 160 is shown demonstrating the entire field of view 48 with the detected trailer angle vector and the measured trailer vector 150b annotated as graphical information superimposed on the image data 160. The detected trailer vector 150a is also shown as the solid arrow annotated over the tongue 26 of the trailer 10. The image data may be representative of recorded data that may be stored by the system 8 for documentation and review of the training process 56a as discussed herein. As provided by the disclosure, the training process 56a may provide drastic improvements in efficiency and execution time required to optimize the operation of the neural network 122 by providing real-time measurement of the trailer angle γ from the trailer angle detection apparatus 102. In this way, the system 8 may also limit the necessity of human interaction or oversight required for the training process 56a.

It is to be understood that variations and modifications can be made on the aforementioned structures and methods without departing from the concepts of the present invention, and further it is to be understood that such concepts are intended to be covered by the following claims unless these claims by their language expressly state otherwise.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

The invention claimed is:

1. A trailer angle identification system comprising:
an imaging device configured to capture a plurality of images;
an angle sensor configured to measure a first angle of the trailer relative to a vehicle; and
a controller configured to:
process the plurality of images in a neural network;
estimate a second angle of the trailer relative to the vehicle based on the plurality of images;
identify an error in the second angle by comparing the first angle to the second angle for the plurality of images;
train the neural network based on the first angle and the second angle for the plurality of images; and
identify additional image data for training the neutral network that depicts a condition of the image data corresponding to the error.

2. The system according to claim 1, wherein the controller is further configured to:
label the image with the first angle as an input to the neural network.

3. The system according to claim 1, wherein the controller is further configured to:
train the neural network to identify an actual angle between the vehicle and the trailer based on the image without the first angle from the angle sensor.

4. The system according to claim 1, wherein the training comprises:
identifying an error between the first angle and the second angle.

5. The system according to claim 1, wherein the imaging device is configured to capture the image in a field of view directed at a connection interface of the trailer to the vehicle.

6. The system according to claim 1, wherein the controller is further configured to:
compare the second angle estimated in the plurality of images to the first angle measured by the angle sensor.

7. The system according to claim 1, wherein the condition comprises at least one of the trailer angle, an environmental condition, and a lighting condition.

8. The system according to claim 1, wherein the controller is further configured to:
train the neural network with the additional image data that depicts the condition corresponding to the error condition.

9. A method identifying a trailer angle comprising:
capturing a plurality of images in a field of view;
detecting a first angle with an angle sensor in connection with a vehicle or a trailer;
processing the images in a neural network;
estimating a second angle of an interface between the vehicle and the trailer based on each of the images; and
training the neural network based on the first angle and the second angle for each of the images, wherein the training comprises:
identifying an error between the first angle and the second angle for each of the images;
identifying at least one of the trailer angle, an environmental condition, and a lighting condition associated with the error for each of the images, and
capturing additional images based on at least one of the trailer angle, the environmental condition, and the lighting condition associated with the error.

10. The method according to claim 9, wherein the angle sensor is configured to communicate an electronic signal to a controller based on the trailer angle formed by the interface.

11. The method according to claim 10, wherein the field of view is directed at an interface of the trailer to the vehicle.

12. The method according to claim 10, further comprising:
cropping the images based on a location of the interface in the field of view.

13. The method according to claim 9, wherein the training further comprises:
processing the additional images with the neural network thereby improving the estimation of the second angle by updating the parameters of the neural network.

14. The method according to claim 13, wherein the training further comprises:
training the neural network to accurately estimate the trailer angle based on the images without the first angle from the angle sensor.

15. The method according to claim 9, wherein the additional images depict at least one image condition depicted as the trailer angle, the environmental condition, or the lighting condition associated with the error.

16. A trailer angle identification system comprising:
an imaging device configured to capture image data;
an angle sensor configured to measure a first angle of the trailer relative to a vehicle; and
a controller configured to:
crop the image data generating a cropped image data based on a location of an interface between the vehicle and the trailer in the image data;
process the cropped image data in a neural network;
estimate a second angle of the trailer relative to the vehicle based on the cropped image data; and
train the neural network based the first angle and the second angle;
identify an error in the second angle by comparing the first angle to the second angle for the plurality of images, and
identify additional image data for training the neutral network that depicts a condition of the image data corresponding to the error.

17. The system according to claim 16, wherein the imaging device is configured to capture the image in a field of view directed at the interface of the trailer to the vehicle.

18. The system according to claim 16, wherein the controller is further configured to:
train the neural network with the additional image data that depicts the condition corresponding to the error.

* * * * *